US008782402B2

(12) United States Patent
Flood (10) Patent No.: US 8,782,402 B2
(45) Date of Patent: Jul. 15, 2014

(54) SYSTEM AND METHOD FOR SECURE COMMUNICATIONS (75) Inventor: Kevin Michael Flood, Chicago, IL (US)

(73) Assignee: Bank of America Corporation, Charlotte, NC (US)

( * ) Notice: Subject to any disclaimer, the term of this patent is extended or adjusted under 35 U.S.C. 154(b) by 721 days.

(21) Appl. No.: 12/712,556

(22) Filed: Feb. 25, 2010

(65) Prior Publication Data

US 2011/0208960 A1  Aug. 25, 2011

(51) Int. Cl.
*H04L 29/06* (2006.01)
*H04L 9/32* (2006.01)
*H04K 1/00* (2006.01)
*H04L 9/00* (2006.01)
*G06F 21/00* (2013.01)
*G06Q 20/00* (2012.01)
*G06F 21/62* (2013.01)
*G06F 21/10* (2013.01)
*G06Q 20/38* (2012.01)

(52) U.S. Cl.
CPC ........ H04L 63/0428 (2013.01); G06F 21/6209 (2013.01); *G06F 2221/2107* (2013.01); H04L 63/08 (2013.01); G06F 21/10 (2013.01); *G06F 2211/007* (2013.01); *G06Q 20/382* (2013.01)
USPC ........................................................ 713/162

(58) Field of Classification Search
CPC . H04L 63/0428; H04L 63/08; G06F 21/6209; G06F 2221/2107; G06F 21/10; G06F 2211/007; G06Q 20/382

USPC ................. 713/162, 165, 168; 380/255, 262; 705/51, 64
See application file for complete search history.

(56) References Cited

U.S. PATENT DOCUMENTS

| | | | |
|---|---|---|---|
| 7,711,641 B1* | 5/2010 | Seale et al. ...................... | 705/39 |
| 2005/0076247 A1* | 4/2005 | Wittkotter ..................... | 713/202 |
| 2009/0067633 A1* | 3/2009 | Dawson et al. ................ | 380/279 |
| 2009/0248808 A1* | 10/2009 | Izumi et al. ................... | 709/206 |
| 2009/0274300 A1* | 11/2009 | Tou et al. ...................... | 380/255 |
| 2010/0281265 A1* | 11/2010 | Ogawa .......................... | 713/176 |
| 2012/0011357 A1* | 1/2012 | Finlay ........................... | 713/152 |

* cited by examiner

*Primary Examiner* — Aravind Moorthy
(74) *Attorney, Agent, or Firm* — Banner & Witcoff, Ltd.; Michael A. Springs (57) ABSTRACT Encryption of electronic messages may be automatically processed by a messaging system based on keywords or other attributes of the messages. In one example, if the message includes a predefined keyword, the messaging system may automatically encrypt the message for all recipients outside of a private network. In another example, the messaging system may automatically encrypt messages based on recipient address. Thus, if a recipient is on a list of addresses to which encryption applies, the message being sent to that particular recipient may be encrypted while a copy of the message being sent to other recipients not on the list might remain unencrypted.

20 Claims, 6 Drawing Sheets

SYSTEM AND METHOD FOR SECURE COMMUNICATIONS

BACKGROUND

Communications regarding an account holder's financial status and transactions are generally considered highly confidential and sensitive. Accordingly, when a financial institution communicates with its account holders, the communications, such as emails, are often protected in some manner to prevent unauthorized access. In some instances, a financial institution employee preparing the communications may need to manually secure the communications before transmitting it to an intended recipient. Such a manual process may be cumbersome and reduce the speed and efficiency of the financial institution.

SUMMARY

The following presents a simplified summary in order to provide a basic understanding of some aspects of the invention. The summary is not an extensive overview of the invention. It is neither intended to identify key or critical elements of the invention nor to delineate the scope of the invention. The following summary merely presents some concepts of the invention in a simplified form as a prelude to the description below.

According to one or more aspects, a message processing system may receive a message from a sender and determine whether the message is subject to encryption consideration. The determination may be made based on whether the message includes one or more attributes such as keywords, flags and other types of indicators. If the message is subject to encryption consideration, the system may identify recipients of the message that are subject to encryption rules. For example, encryption rules may specify that all recipients outside of an internal or private network from which the message is being sent must receive encrypted messages. Accordingly, copies of the message being sent to each recipient outside of the internal or private network (or portions thereof) may be encrypted.

According to another aspect, a message processing system may also identify override attributes associated with an electronic message. An override attribute may indicate that no encryption processing is to be performed on the electronic message even if the message includes an encryption attribute. Thus, the override attribute may supersede or override encryption attributes.

According to another aspect, if encryption is to be performed on a message, an unencrypted message may remain to notify a user that an encrypted message is available for viewing. For example, the notification message may include an identification of a location where the encrypted message may be retrieved and viewed. Alternatively or additionally, the notification message may provide instructions on how to decrypt and/or read an encrypted message attached to the notification message.

BRIEF DESCRIPTION OF THE DRAWINGS

The present disclosure is illustrated by way of example and not limited in the accompanying figures in which like reference numerals indicate similar elements.

DETAILED DESCRIPTION

In the following description of various illustrative embodiments, reference is made to the accompanying drawings, which form a part hereof, and in which is shown, by way of illustration, various embodiments in which the claimed subject matter may be practiced. It is to be understood that other embodiments may be utilized and structural and functional modifications may be made without departing from the scope of the present claimed subject matter.

Figure 1:
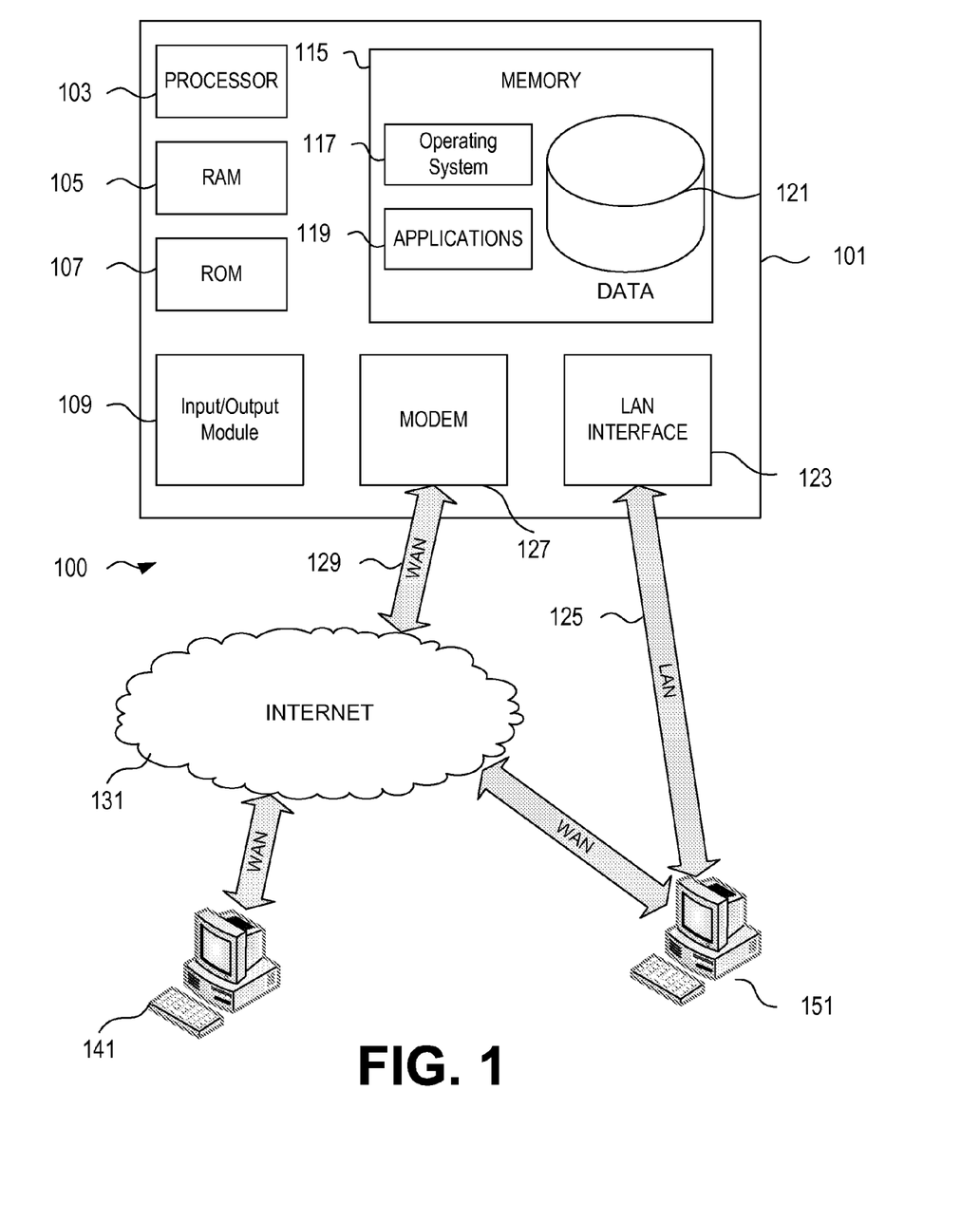
FIG. 1 illustrates an example of a suitable operating environment in which various aspects of the disclosure may be implemented.

FIG. 1 illustrates a block diagram of a generic computing device 101 (e.g., a computer server) in computing environment 100 that may be used according to an illustrative embodiment of the disclosure. The computer server 101 may have a processor 103 for controlling overall operation of the server and its associated components, including random access memory (RAM) 105, read-only memory (ROM) 107, input/output (I/O) module 109, and memory 115.

I/O 109 may include a microphone, mouse, keypad, touch screen, scanner, optical reader, and/or stylus (or other input device(s)) through which a user of server 101 may provide input, and may also include one or more of a speaker for providing audio output and a video display device for providing textual, audiovisual and/or graphical output. Software may be stored within memory 115 and/or other storage to provide instructions to processor 103 for enabling server 101 to perform various functions. For example, memory 115 may store software used by the server 101, such as an operating system 117, application programs 119, and an associated database 121. Alternatively, some or all of server 101 computer executable instructions may be embodied in hardware or firmware (not shown).

The server 101 may operate in a networked environment supporting connections to one or more remote computers, such as terminals 141 and 151. The terminals 141 and 151 may be personal computers or servers that include many or all of the elements described above relative to the server 101. The network connections depicted in FIG. 1 include a local area network (LAN) 125 and a wide area network (WAN) 129, but may also include other networks. When used in a LAN networking environment, the computer 101 may be connected to the LAN 125 through a network interface or adapter 123. When used in a WAN networking environment, the server 101 may include a modem 127 or other network interface for establishing communications over the WAN 129, such as the Internet 131. It will be appreciated that the network connections shown are illustrative and other means of establishing a communications link between the computers may be used.

The existence of any of various well-known protocols such as TCP/IP, Ethernet, FTP, HTTP, HTTPS, and the like is presumed.

Computing device 101 and/or terminals 141 or 151 may also be mobile terminals (e.g., mobile phones, PDAs, notebooks, etc.) including various other components, such as a battery, speaker, and antennas (not shown).

The disclosure is operational with numerous other general purpose or special purpose computing system environments or configurations. Examples of well known computing systems, environments, and/or configurations that may be suitable for use with the disclosure include, but are not limited to, personal computers, server computers, hand-held or laptop devices, multiprocessor systems, microprocessor-based systems, set top boxes, programmable consumer electronics, network PCs, minicomputers, mainframe computers, distributed computing environments that include any of the above systems or devices, and the like.

The disclosure may be described in the general context of computer-executable instructions, such as program modules, being executed by one or more computers and/or one or more processors associated with the computers. Generally, program modules include routines, programs, objects, components, data structures, etc. that perform particular tasks or implement particular abstract data types. Aspects of the disclosure may also be practiced in distributed computing environments where tasks are performed by remote processing devices that are linked through a communications network. In a distributed computing environment, program modules may be located in both local and remote computer storage media including memory storage devices.

Figure 2:
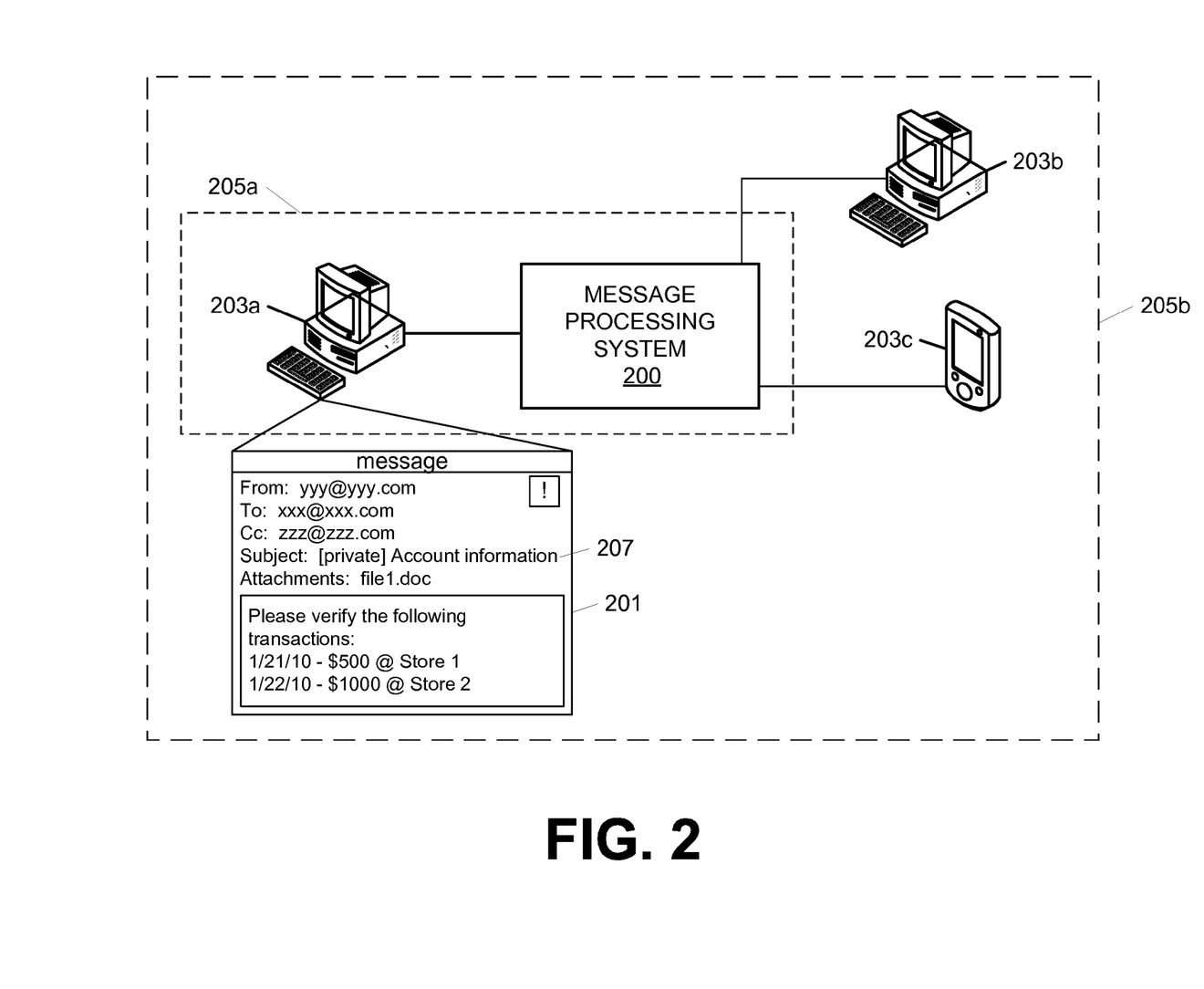
FIG. 2 illustrates an example network environment for processing financial transactions according to one or more aspects described herein.

FIG. 2 illustrates a message processing system 200 that may be used to determine whether encryption is needed for one or more recipients of a particular electronic message. For example, an electronic message 201 may specify 3 recipients, one recipient 203a having an address that is internal to a private network and the other two 203b and 203c having messaging addresses external to private network 205a. Private network 205a may be limited to access by devices, employees or entities associated with a business or organization such as a bank or other financial institution. Accordingly, for system 200 to deliver electronic message 201 to recipients 203b and 203c, the message 201 may be sent over public network 205b. System 200 may store messaging rules that require all messages delivered outside of private network 205a to be encrypted. The rules might not require encryption for messages delivered within private network 205a. In some arrangements, the messaging rules (e.g., encryption) may be triggered if the message, e.g., message 201 includes a flag or other attribute. For example, message 201 may include the key "[private]" in subject line 207. Thus, system 200, when determining that subject line 207 includes the code "[private]", may identify encryption rules associated therewith. Other flags or triggering indicators may include a predefined messaging address (e.g., private@encrypt.xx), a word or key in the body of the message (e.g., "CONFIDENTIAL"), a color used (e.g., for text), an image, an attachment, a metadata flag or indicator (e.g., high importance flag), and/or combinations thereof. Electronic messages may include audio messages (e.g., voicemail, audio message forwarding), video messages and/or text messages (e.g., electronic mail, instant messages, broadcast messages).

Figure 3:
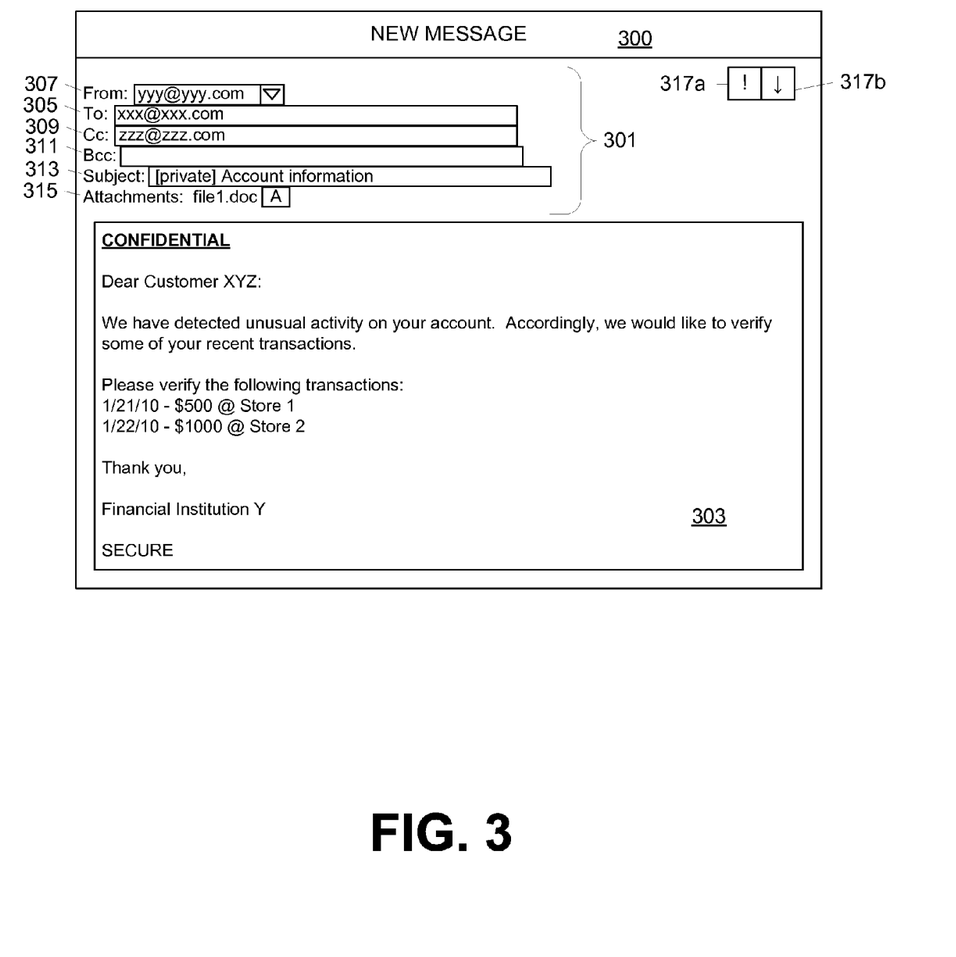
FIG. 3 illustrates an example electronic message including various encryption/security attributes according to one or more aspects described herein.

FIG. 3 illustrates an example electronic message including various flags or indicators for triggering an encryption rule. Message 300 may include a header portion 301 and a body portion 303. Header portion 301 may include To: field 305 for indicating one or more addressees, From: field 307 that may be modifiable to specify the sender of message 300, carbon copy field 309 and blind carbon copy field 311 for additional addressees, subject line 313, attachments 315 and importance/urgency flags 317. Body portion 303 may include a message that is to be conveyed to the addressee(s). In one or more examples, body portion 303 may include a financial alert message to notify an addressee that unusual account activity was detected by a financial institution. In another example, body portion 303 may include a financial account statement detailing all transactions taking place during a specified period and other account status information (e.g., a balance). Other types of messages may be considered confidential or private and be susceptible to encryption rules depending on various factors such as a user preferences, sender configurations, governmental regulations and laws and the like.

Various types of indicators and flags may be set to trigger an encryption process by a messaging system (e.g., system 200 of FIG. 2). In one example addressee field 305, carbon copy field 309 or blind carbon copy field 311 may be populated with a predefined address such as encrypt@institutions-name.com. A messaging server, upon detecting the predefined address, may analyze the message 300 to determine whether it should be encrypted prior to sending to one or more of the other addressees. In another example, if a certain level of importance or urgency is indicated in message 300, e.g., using flags 317, a message encryption rule may also be triggered. In yet another example, encryption rules may depend on the sender. Accordingly, the messaging system may store a list of senders for which messages are to be encrypted, for example at all times or if going outside of the network. Senders not on the list may be exempt or might not trigger message encryption processes. An additional or alternative encryption rule may include encrypting messages that include attachments. In some instances, the system may differentiate between different types of attachments and only require encryption processes to be triggered for audio, video, HTML documents, PDF documents or the like. In yet other arrangements, encryption processes may be triggered if one or more of carbon copy field 309 or blind carbon copy field 311 is populated with at least one address.

Within body portion 303, certain attributes may be defined that are configured to trigger encryption processes. These attributes may include the appearance of text (e.g., font, style, size, color), embedded images, text or other information, words or images used, placement of information and/or combinations thereof. In one example, if the word "CONFIDENTIAL" or "SECURE" is included in body portion 303 in bold and underline, the messaging processing system may trigger the messaging encryption process. Alternatively or additionally, triggering of the encryption process may require that the word "CONFIDENTIAL" is the first word appearing in body portion 303 as read from top to bottom and left to right and is bolded and underlined. In another example, an encryption process may be triggered if any word in the document appears in the color red. As noted herein, various combinations of message attributes may function as triggers to encryption processes. For example, encryption processes may be triggered when an attachment exists in message 300 and the words "PRIVATE" in all capital letters is included in body portion 303. Other combinations may be used depending on the preferences of a messaging control authority.

According to another aspect, a user may define certain attributes of an electronic message such as message 300 to override encryption. For example, if a message includes an encryption triggering word such as "CONFIDENTIAL," but the sender does not want an encryption process to be performed on the message, the user may provide an override flag or indicator such as "[OVERRIDE]." As noted above, such indicators, flags and attributes may be identified based on location, font, content (e.g., keywords, symbols, etc.), color, field (e.g., To: field, CC: field, subject line field) and the like. If an override attribute is detected, the override attribute may supersede any triggering attribute identified in the message. Thus, if both "CONFIDENTIAL" and "[OVERRIDE]" exist in message 300, no encryption process may be performed based on the override command superseding the detected "CONFIDENTIAL" trigger word.

Figure 4:
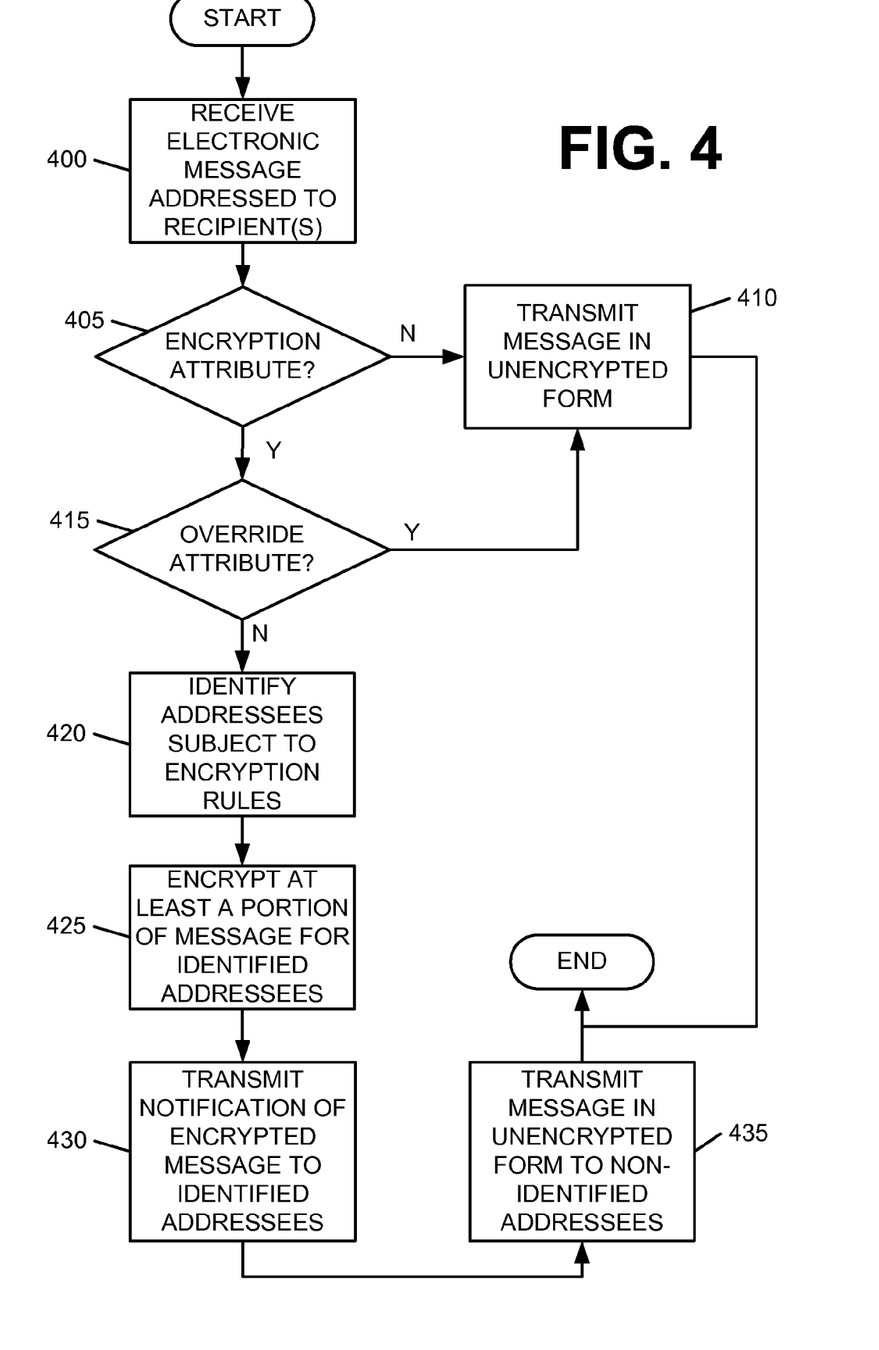
FIG. 4 is a flowchart illustrating an example method for processing electronic communications for encryption according to one or more aspects described herein.

FIG. 4 illustrates a method by which an electronic message may be transmitted to one or more addressees. In step 400, an electronic message processing system may receive an electronic message that is to be sent to one or more recipients. In step 405, the system may determine if the electronic message includes an attribute indicating a need or desire for the electronic message to be processed for encryption. The various attributes that may serve as such an indicator are discussed herein. If the electronic message does not include such an attribute, the message may be transmitted to the addressees without encryption in step 410. If, however, the electronic message includes such an attribute, the system may determine whether an override attribute exists in the message in step 415. If so, the message may be transmitted without encryption as described in step 410.

Upon determining that an encryption process indicator is included and an override attribute does not exist in the message, the system may identify which addressees are subject to encryption rules in step 420. For example, if only addressees outside of a private network are subject to encryption rules, the system might not identify addressees that are within the private network. Alternatively or additionally, addressees subject to encryption rules may be specified in a predefined list and may include private and public network addressees. In step 425, the system may encrypt at least a portion of the message for the addressees identified in step 420. For example, a main portion of the message may be encrypted, but a header portion or notification portion (e.g., to indicate that an encrypted message is waiting for the recipient) may remain unencrypted. In one or more examples, the encrypted portion of the message may be stored on a website or other network accessible location. The user may then login to the site or network location to securely access the message. That is, the message may be decrypted upon the user successfully identifying themselves to the system.

Once the encryption process has been completed, the system may transmit a notification of the encrypted message to the identified addressees in step 430. The message may further be transmitted to the non-identified addresses in the unencrypted form as shown in step 435. In one example, the message sent to the identified addressees may comprise a notification that an encrypted message is waiting for them. The encrypted message may be attached to the notification message or may be stored separately, e.g., on a website that the recipient may separately access. In other arrangements, the entire message may be encrypted and sent in its encrypted form to the recipient.

Figure 5:
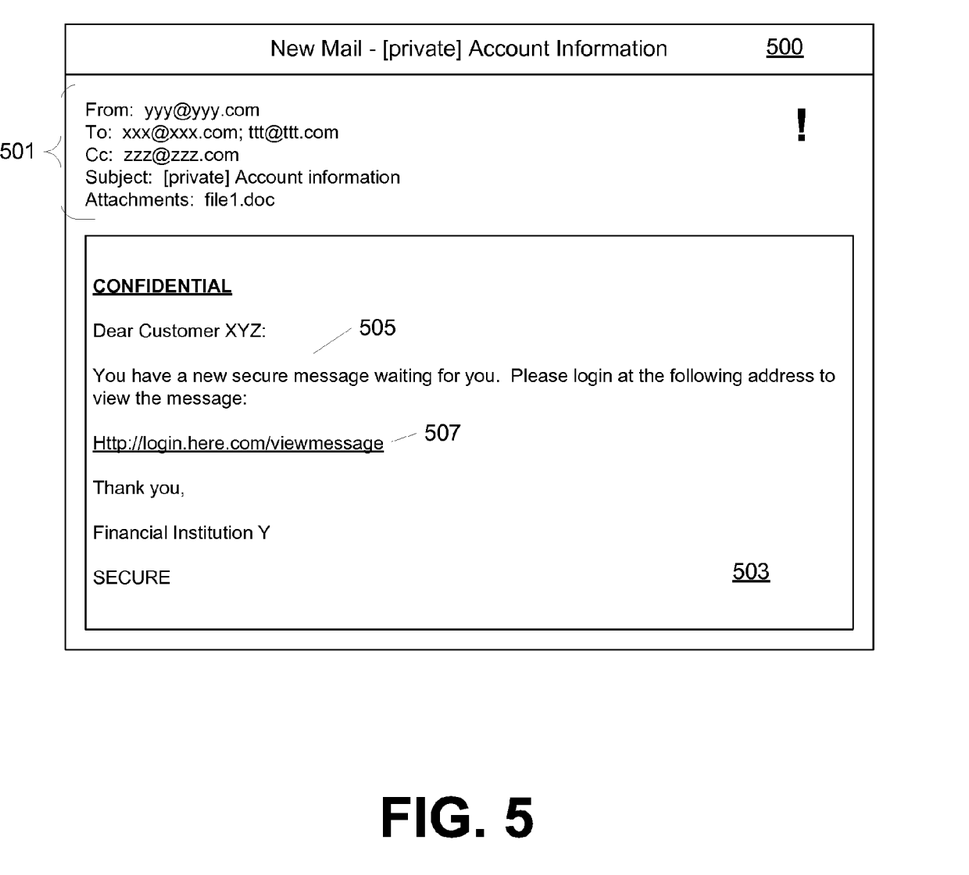
FIG. 5 illustrates an example electronic communication that may be received by an addressee indicating that an encrypted message is available for viewing according to one or more aspects described herein.

FIG. 5 illustrates an example message received by a recipient that is subject to encryption processing and rules. The message 500 may include header information 501 that identifies sender information, addressee information, a subject, urgency/importance flags, attachments and the like. Body portion 503 may include a notification 505 that an encrypted message is waiting for the recipient along with instructions on how to access the message. For example, message 500 may indicate that the user must follow a link 507 and successfully authenticate his or her identity to retrieve and view the encrypted message. Alternatively or additionally, the message may be included as an attachment. The message may be in a password protected or other encrypted form requiring the user to authenticate themselves before allowing the document or message to be properly rendered. For example, the document may be a password protected ZIP file, PDF document or WORD file. Various other mechanisms for encrypting a message and requiring a user to authenticate his or her identity prior to allowing the encrypted message to be read in the unencrypted form may be used.

According to one or more aspects, specific portions of a message may be subject to encryption while other portions are not. For example, encryption rules might only require that an audio portion of a message including both audio and video be encrypted. In another example, encryption rules may specify that only a portion of a message following the encryption attribute (e.g., a keyword or phrase in the body of an e-mail) be encrypted. Other configurations may be used depending on the preferences and/or requirements of the sender or recipient.

Figure 6:
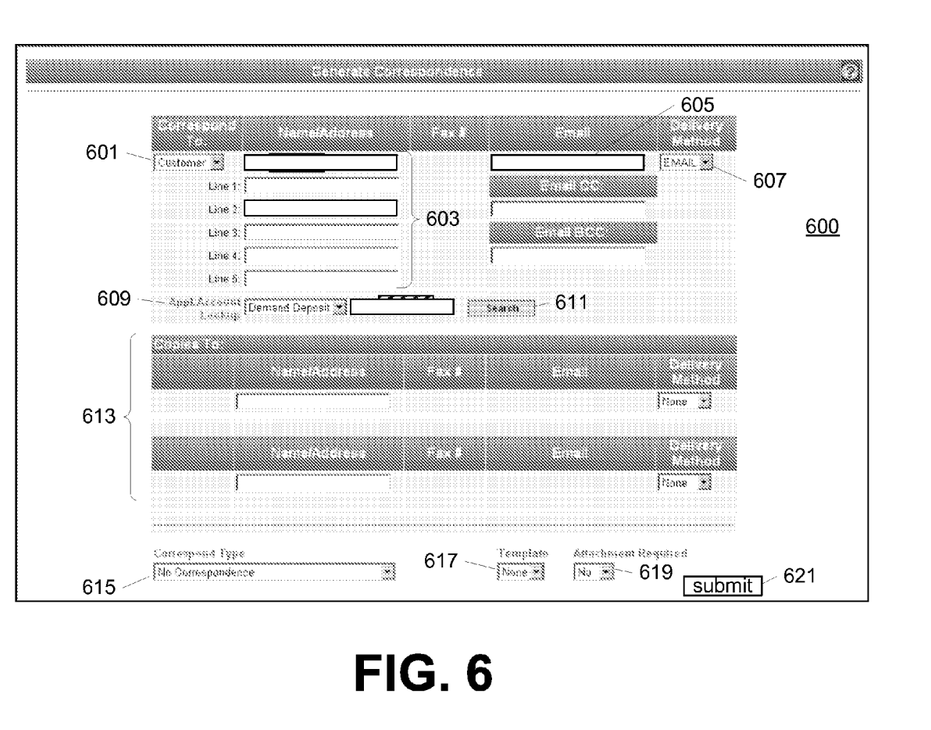
FIG. 6 illustrates an example user interface through which correspondence may be generated for transmission to one or more intended recipients.

FIG. 6 illustrates an example user interface through which correspondence with an intended recipient may be generated. Interface 600 may be configured to allow a user to generate electronic correspondence or physical correspondence by filling in a plurality of fields such as fields 601, 605, 607, 609, 613, 615, 617 and 619. An underlying correspondence generating system may then take the input and automatically generate correspondence such as an e-mail or a letter. Alternatively, the information may be submitted for manual creation of the correspondence. Field 601 may be used to define a type of recipient to which the correspondence is addressed. Recipient type field 601 may include options such as Customer, Internal, Bank, Servicer or the like. Field 603 may then allow a user to enter one or more names or addresses for each of the recipients. E-mail field 605 provides the option for a user to specify the e-mail address corresponding to the intended recipients. In some arrangements, e-mail field 605 may be automatically populated upon entering a name or address in field 603. Alternatively or additionally, e-mail field 605 may be automatically populated based on the recipient type specified in field 601. For example, if the recipient type is customer, e-mail field 605 may automatically be populated with a predefined address where all customer-directed e-mails are to be received and screened prior to leaving an organization with which the correspondence generating system is associated. A user may further specify the type of delivery in field 607, where the delivery method may include e-mail, postal mail, instant message, text message, telephone and the like.

Interface 600 may provide further options including an account specification field 609 where a financial account (or other type of account) at issue may be defined. In one or more arrangement, field 609 may include a drop down menu of different account types and may also include a search option 611 to find a particular account number. Furthermore, copies of the correspondence may be sent to individuals, organizations or other entities specified in fields 613. Copies of the correspondence may be sent using different delivery methods, if desired. A correspondence type field 615 may be provided to specify a level of importance, urgency, sensitivity or other attribute of the correspondence. For example, correspondence type field 615 may be defined as a closing document—customer correspondence that requires immediate sending.

In some arrangements, a user may be allowed to specify a type of template to use when generating the correspondence through option 617. Different templates may be used or made available based on the delivery method, recipient type, names or addresses of the recipients, correspondence type and/or combinations thereof. The existence or inclusion of attachments may be specified using option 619. When the desired attributes of the correspondence have been defined, the user may then submit the information for correspondence generation using option 621.

As noted, in some embodiments, a message may be generated and/or reviewed automatically by a system or manually or a combination thereof. For example, a message generation request may be submitted through interface 600 of FIG. 6 as an e-mail to a particular e-mail address. The e-mail may then be opened and an attachment that includes information relating to a transaction associated with an account may be extracted therefrom. For example, the transaction information may be a transaction amount, transaction date, account from which the transaction was made, account number, reference number and the like. The system or a user may then verify that a recipient specified in the correspondence request exists within a knowledge database (i.e., validate that the recipient is actually a customer or client). Subsequently, one or more addresses corresponding to the specified recipient may be retrieved from the knowledge database. A reference number may also be retrieved from the correspondence request. The user may then review and/or analyze information stored in one or more folders associated with a case or account corresponding to the reference number. Additionally, the user may print a copy of the transaction information and store the information in the one or more folders. The user may then create an e-mail for the one or more intended recipients and attach the transaction information stored to the one or more folders and specify the addresses included in the message generation request and/or retrieved from the knowledge database. In one or more arrangements, a user may include a form or template message script into the message. Alternatively or additionally, the user may include a customized message. The user may then select a mark secure and send option/command that tags the message for encryption or security processing prior to being sent out to the intended recipient(s).

The methods and features recited herein may further be implemented through any number of computer readable media that are able to store computer readable instructions. Examples of computer readable media that may be used include RAM, ROM, EEPROM, flash memory or other memory technology, CD-ROM, DVD, or other optical disc storage, magnetic cassettes, magnetic tape, magnetic storage and the like.

While illustrative systems and methods described herein embodying various aspects are shown, it will be understood by those skilled in the art that the invention is not limited to these embodiments. Modifications may be made by those skilled in the art, particularly in light of the foregoing teachings. For example, each of the elements of the aforementioned embodiments may be utilized alone or in combination or sub-combination with the elements in the other embodiments. It will also be appreciated and understood that modifications may be made without departing from the true spirit and scope of the present invention. The description is thus to be regarded as illustrative instead of restrictive on the present invention.

The invention claimed is:

1. A method comprising:
    determining, by a financial institution communication system, whether performance of an encryption process for an electronic communication is desired including determining whether the electronic communication includes an indicator specifying that the electronic communication is to be encrypted;
    in response to determining that the electronic communication does not include the indicator, sending the electronic communication without performing the encryption process;
    in response to determining that performance of the encryption process for the electronic communication is desired:
        determining, by the financial institution communication system, a first recipient address of the electronic communication;
        determining whether the first recipient address is external to an internal financial institution network in which a source device of the electronic communication is operating; and
        in response to determining that the first recipient address is external to the internal financial institution network, encrypting at least a portion of a message of the electronic communication prior to sending the electronic communication to the first recipient address,
        otherwise, sending the electronic communication to the first recipient address without encrypting the at least a portion of the message of the electronic communication.

2. The method of claim 1, further comprising:
    determining a second recipient address of the electronic communication;
    determining whether the second recipient address is internal to the internal financial institution network; and
    in response to determining that the second recipient address is internal to the internal financial institution network, transmitting the electronic communication to the second recipient address without encrypting the at least a portion of the message.

3. The method of claim 1, wherein the indicator includes one or more characters in a subject line of the electronic communication.

4. The method of claim 1, wherein the message is provided as at least one of: an attachment to the electronic communication and a message stored on a remote network site, and wherein encrypting the message includes requiring a recipient corresponding to the first recipient address to login prior to viewing the at least a portion of the message.

5. The method of claim 4, wherein another portion of the message remains unencrypted and provides instructions for viewing the encrypted at least a portion of the message.

6. The method of claim 1, further comprising storing the encrypted at least a portion of the message on a network accessible location.

7. The method of claim 1, wherein determining whether performance of the encryption process is desired includes:
    determining that the electronic communication includes the indicator specifying that the electronic communication is to be encrypted;
    determining whether the electronic communication includes an encryption process override attribute different from the indicator; and
    in response to determining that the electronic communication includes the encryption process override attribute and the encryption indicator, sending the electronic communication without performing the encryption process irrespective of the indicator being included in the electronic communication.

8. The method of claim 7, wherein the indicator comprises a keyword in a body of the message of the electronic communication and wherein the method further comprises:

in response to determining that the electronic communication includes the encryption indicator but not the encryption process override attribute, encrypting only a portion of the body of the message following the keyword.

9. An apparatus comprising:
a processor; and
memory operatively coupled to the processor and storing computer readable instructions that, when executed, cause the apparatus to:
determine whether performance of an encryption process for an electronic communication is desired including determining whether the electronic communication includes an indicator specifying that the electronic communication is to be encrypted;
in response to determining that the electronic communication does not include the indicator, send the electronic communication without performing the encryption process;
in response to determining that the encryption process is desired for the electronic communication:
determine a first recipient address of the electronic communication;
determine whether the first recipient address is external to an internal financial institution network in which a source device of the electronic communication is operating; and
in response to determining that the first recipient address is external to the internal financial institution network, encrypt at least a portion of a message of the electronic communication prior to sending the electronic communication to the first recipient address;
otherwise, sending the electronic communication to the first recipient address without encrypting the at least a portion of the message.

10. The apparatus of claim 9, wherein the computer readable instructions, when executed, further cause the apparatus to:
determine a second recipient address of the electronic communication;
determine whether the second recipient address is internal to the internal financial institution network; and
in response to determining that the second recipient address is internal to the internal financial institution network, transmit the electronic communication to the second recipient address without encrypting the at least a portion of the message.

11. The apparatus of claim 10, wherein another portion of the message remains unencrypted and provides instructions for viewing the encrypted at least a portion of the message.

12. The apparatus of claim 9, wherein the computer readable instructions, when executed, further cause the apparatus to store the encrypted at least a portion of the message on a network accessible location.

13. The apparatus of claim 9, wherein determining whether to perform the encryption process includes determining whether the electronic communication includes an encryption process override attribute.

14. The apparatus of claim 9, wherein the indicator comprises a color of text in the electronic communication.

15. One or more non-transitory computer readable media storing computer readable instructions that, when executed, cause an apparatus to:
determine whether performance of an encryption process for an electronic communication is desired including determining whether the electronic communication includes an indicator specifying that the electronic communication is to be encrypted;
in response to determining that the electronic communication does not include the indicator, send the electronic communication without performing the encryption process;
in response to determining that the encryption process is desired for the electronic communication:
determine a first recipient address of the electronic communication;
determine whether the first recipient address is external to an internal financial institution network in which a source device of the electronic communication is operating; and
in response to determining that the first recipient address is external to the internal financial institution network, encrypt at least a portion of a message of the electronic communication prior to sending the electronic communication to the first recipient address,
otherwise, send the electronic communication to the first recipient address without encrypting the at least a portion of the message.

16. The one or more computer readable media of claim 15, wherein the computer readable instructions, when executed, further cause the apparatus to store the encrypted at least a portion of the message on a network accessible location.

17. The one or more computer readable media of claim 15, wherein determining whether to perform the encryption process includes determining whether the electronic communication includes an encryption process override attribute.

18. The one or more computer readable media of claim 15, wherein the indicator comprises a keyword in the electronic communication.

19. The one or more computer readable media of claim 15, wherein the encrypted at least a portion of the message is included in the electronic communication as an attachment.

20. The one or more computer readable media of claim 15, wherein encryption of the at least a portion of the message includes password-protecting the at least a portion of the message.

* * * * *